United States Patent [19]

Kertzman

[11] Patent Number: 4,825,937
[45] Date of Patent: May 2, 1989

[54] SEALING APPARATUS FOR AUTOMOBILE RADIATORS

[76] Inventor: Harvey Z. Kertzman, 715 Jerusalem Rd., Cohasset, Mass. 02025

[21] Appl. No.: 217,779

[22] Filed: Jul. 12, 1988

[51] Int. Cl.$^4$ ............................................... F28F 11/06
[52] U.S. Cl. ........................................ 165/13; 165/40; 165/70
[58] Field of Search .................. 165/13, 32, 70, 31, 165/38, 71, 40

[56] References Cited

U.S. PATENT DOCUMENTS

| 2,501,709 | 3/1950 | Booth | 165/38 |
| 3,406,745 | 10/1968 | Caslelet | 165/40 |
| 4,738,304 | 4/1988 | Chalmers et al. | 165/13 |

FOREIGN PATENT DOCUMENTS

| 16211 | of 1894 | United Kingdom | 165/40 |
| 572889 | 10/1945 | United Kingdom | 165/70 |

Primary Examiner—Albert W. Davis, Jr.
Assistant Examiner—John K. Ford
Attorney, Agent, or Firm—John M. Brandt

[57] ABSTRACT

A sealing apparatus for isolating a ruptured motor vehicle radiator tube connected between two fluid reservoirs consisting of a valve positioned to seal at least one end of the tube and a bar of impact shatterable material disposed within the tube arranged to bias the valve apart from the end of the tube.

5 Claims, 2 Drawing Sheets

SEALING APPARATUS FOR AUTOMOBILE RADIATORS

BACKGROUND OF THE INVENTION

1. Field of the Invention:

The invention resides in the field of radiators for water cooled motor vehicles and more particularly relates to devices for isolating a damaged, i. e. leaking, coolant tube.

2. Description of the Prior Art:

In water cooled motor vehicles, water is circulated from an engine jacket to and through a radiator consisting of a plurality of tubes which reduce the temperature of the water through heat exchange with the environment. Any damage to a tube which results in a leak will soon drain the water from the vehicle cooling system causing the vehicle to be disabled after a short period.

This problem is of particular concern in military transporters subject to enemy fire which is often directed specifically at radiators for the particular purpose of puncturing the tubes to disable the vehicles.

Heretofore the only solution known to applicant has been to shield the radiators to deflect incoming bullets.

The present invention is directed to apparatus which seals and isolates individual circulating tubes by providing a valve for each which is biased apart from the tube end by a shatterable bar which will collapse, allowing the valve to seat upon the impact of a tube rupturing projectile.

Applicant knows of no prior art device of like construction which functions in this manner.

SUMMARY OF THE INVENTION

The invention may be summarized as a device for preventing the draining of cooling fluid from damaged or ruptured motor vehicle radiators by providing valves which seal and isolate individual cooling tubes.

Each tube within the radiator system is separately connected to a supply and sump reservoir through which the cooling fluid, i. e., water and additive such as antifreeze, is pumped and then recirculated to the engine. Hot water enters the supply reservoir from the engine, passes through the plurality of cooling tubes where heat is given up to the environment and then collects in the sump from which it is withdrawn.

A leak in any tube will in time allow of the water to drain causing the engine to overheat and the vehicle to be disabled. By isolating a leaking tube, the system will continue to operate and applicant accomplishes this by providing a shatterable bar of, for example, glass or ceramic within the tube which biases the valve away from a tube end until disintegration of the bar occurs from the impact of a bullet or other projectile.

When the bar collapses, the valve seats and blocks fluid flow in the tube. The vehicle will then continue to operate until such time as appropriate repairs are made.

The various features and advantages of the invention will be more fully understood from the description of the preferred embodiment and drawings which follow.

DESCRIPTION OF THE PREFERRED EMBODIMENT

Figure 1:
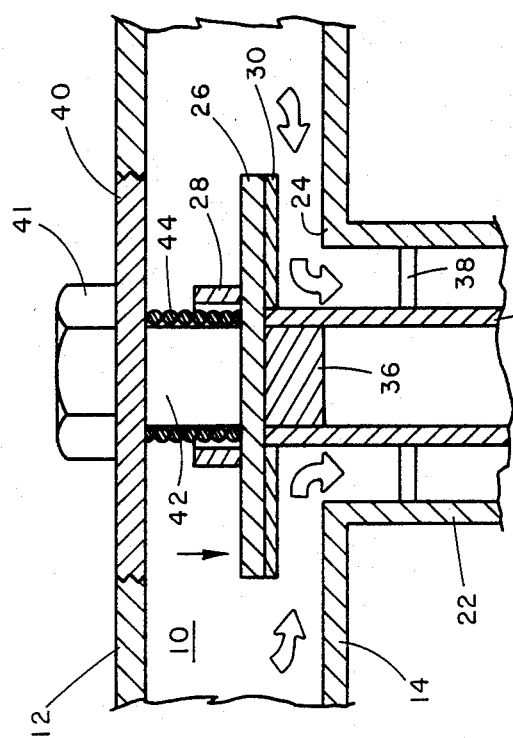
FIG. 1 is a cross-sectional view of the preferred embodiment of the invention.
Figure 1:
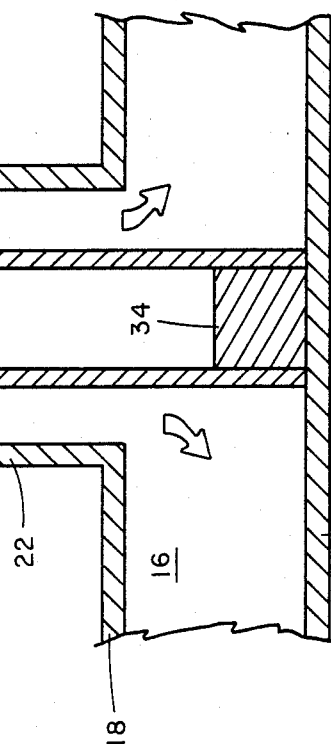

Referring first to FIG. 1, there is shown a portion of an motor vehicle radiator incorporating the preferred embodiment of the invention. The radiator comprises a supply reservoir 10 having upper and lower walls 12 and 14, a sump reservoir 16 having upper and lower walls 18 and 20, and cooling tube 22 of which there are a plurality not shown.

The radiator is normally but not necessarily positioned vertically and the intended path of water circulation is indicated by the flow arrows. In operation water is pumped from the engine to reservoir 10, flows through tube(s) 22 which are drained by and recirculated from reservoir 16.

At the upper end 24 of tube 22 there is positioned a valve consisting of plate 26 and cylindrical guide 28. Gasket 30 is attached to the underside of plate 26 to effect a seal with tube end 24 when the plate is allowed to descend.

Figure 2:
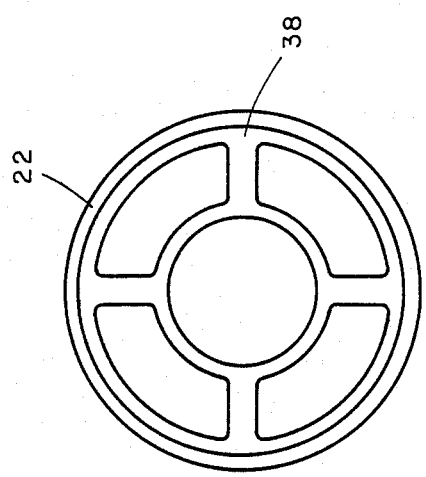
FIG. 2 is a top view of a component of the embodiment of FIG. 1.

Plate 26 is biased away from tube end 24 by impact shatterable bar 32 which extends upward from bottom wall 20. Stub 34 positions bar 32 at the lower end and stub 36 attached to plate 26 performs the same function at the upper end. One or more spider guides 38 as illustrated in FIG. 2 may be used to provide additional support for bar 32 depending upon the length of the bar and the tube.

As a means of assembly and replacement of the various components, plate 40 is threaded into wall 20 above tube 22 and is inserted or removed by for example attached nut 41. An aligning stub 42 is positioned in the center of plate 40 and fits into guide 28 of the valve. Although sufficient water pressure is available from the pumping system, spring 44 which fits over stub 42 and inside guide 28 may optionally be provided to exert additional downward pressure on plate 26 to seal tube 22 upon disintegration of bar 32.

From the above description the operation of the invention will now be clear. Any projectile such as a bullet which is sufficiently powerful to rupture the cooling tube will also cause the shattering and disintegration of bar 32 resulting in the seating of plate 26 against tube end 24 and the isolation of the leaking tube from the rest of the cooling system.

Figure 3:
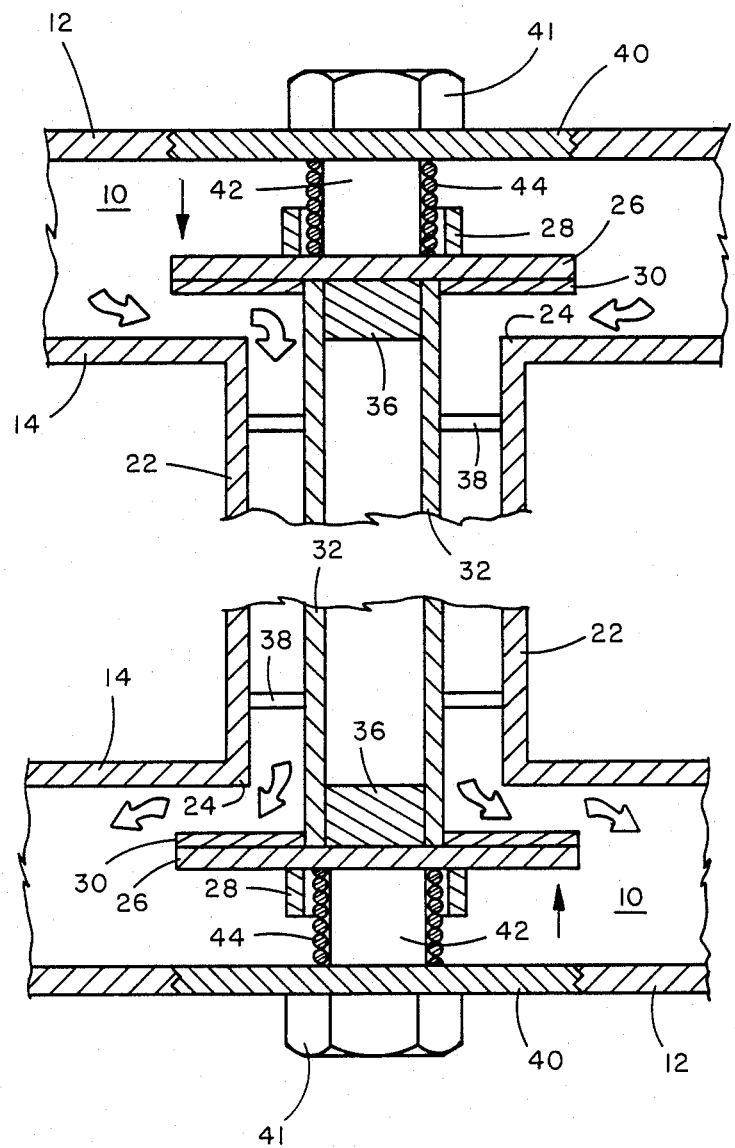
FIG. 3 is a cross-sectional view of another embodiment of the invention.

As will be obvious, an identical duplicate valve arrangement may be provided at both ends of a tube biased by the same bar. This configuration is shown in FIG. 3 where like reference numerals correspond to like parts in FIG. 1. Such a configuration will provide additional reliability and more complete isolation.

The invention is accordingly defined by the following claims.

What is claimed is:

1. Sealing apparatus for isolating a ruptured motor vehicle radiator tube connected between first and second fluid reservoirs comprising in combination:
   a. a valve positioned to seal one end of said tube; and
   b. a bar of impact shatterable material disposed within and along a substantial portion of said tube, said bar arranged to bias said valve apart from said tube end whereby said valve will close to prevent fluid flow in said tube upon the disintegration of said bar.

2. The apparatus of claim 1 further including spring means to counterbias said valve against said bar and said tube end upon the disintegration of said bar.

3. A motor vehicle radiator assembly with sealing apparatus for isolating a ruptured cooling tube comprising in combination:
   a. a supply reservoir arranged to receive heated water from a motor vehicle engine;
   b. a sump reservoir;
   c. at least one cooling tube connected between said supply and sump reservoir;
   d. a valve plate positioned at both ends of said tube to close each end of said tube; and a bar of impact shatterable material disposed within said tube arranged to bias said plates apart from said tube ends.

4. The apparatus of claim 3 including guide means disposed at each tube end to align said plates and said tube.

5. The apparatus of claim 4 further including spring means disposed within said guide means to bias said plates against said tube ends upon disintegration of said bar.

* * * * *